United States Patent
Kurata et al.

(10) Patent No.: US 11,019,113 B2
(45) Date of Patent: May 25, 2021

(54) INFORMATION PROCESSING APPARATUS AND INFORMATION PROCESSING METHOD

(71) Applicant: SONY CORPORATION, Tokyo (JP)

(72) Inventors: Masatomo Kurata, Tokyo (JP); Sota Matsuzawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 33 days.

(21) Appl. No.: 16/300,351

(22) PCT Filed: Mar. 29, 2017

(86) PCT No.: PCT/JP2017/013070
§ 371 (c)(1),
(2) Date: Nov. 9, 2018

(87) PCT Pub. No.: WO2017/199592
PCT Pub. Date: Nov. 23, 2017

(65) Prior Publication Data
US 2019/0166167 A1    May 30, 2019

(30) Foreign Application Priority Data

May 19, 2016  (JP) .............................. JP2016-100684

(51) Int. Cl.
*H04L 29/06* (2006.01)
*G06F 13/00* (2006.01)
(Continued)

(52) U.S. Cl.
CPC .......... *H04L 65/1069* (2013.01); *G06F 13/00* (2013.01); *G06Q 10/1095* (2013.01);
(Continued)

(58) Field of Classification Search
None
See application file for complete search history.

(56) References Cited

U.S. PATENT DOCUMENTS 7,143,428 B1 * 11/2006 Bruck ................ H04N 21/4316
725/37
7,966,194 B2 * 6/2011 Iyer .................... G06Q 30/0212
705/1.1
(Continued)

FOREIGN PATENT DOCUMENTS

JP    2004-215064 A    7/2004
JP    2008-177713 A    7/2008
(Continued)

OTHER PUBLICATIONS

International Search Report and Written Opinion of PCT Application No. PCT/JP2017/013070, dated Jun. 20, 2017, 09 pages of ISRWO.

*Primary Examiner* — Dhairya A Patel
(74) *Attorney, Agent, or Firm* — Chip Law Group

(57) ABSTRACT

There is provided an information processing apparatus including a communication level acquisition unit that acquires a level of mutual communication between users, and a talk room control unit that creates a talk room that a plurality of users access via terminals in order to provide or acquire information, on a basis of the level. With this arrangement, it becomes possible to provide a mechanism that can create a talk room afterward with a person the user actually conversed with on the spot.

12 Claims, 12 Drawing Sheets

(51) Int. Cl.
  *G06Q 10/10* (2012.01)
  *H04L 12/58* (2006.01)
(52) U.S. Cl.
  CPC .............. *H04L 51/16* (2013.01); *H04L 51/32* (2013.01); *H04L 65/4038* (2013.01)

(56) References Cited

U.S. PATENT DOCUMENTS

| | | | | |
|---|---|---|---|---|
| 10,558,339 B1* | 2/2020 | Pitelka | ................... | H04L 51/20 |
| 2004/0176025 A1* | 9/2004 | Holm | ..................... | H04H 60/05 |
| | | | | 455/3.06 |
| 2009/0215469 A1* | 8/2009 | Fisher | ................... | H04W 4/029 |
| | | | | 455/456.3 |
| 2011/0004501 A1* | 1/2011 | Pradhan | ................. | G06Q 50/01 |
| | | | | 705/319 |
| 2012/0124508 A1* | 5/2012 | Morin | ..................... | H04L 51/32 |
| | | | | 715/781 |
| 2012/0271883 A1* | 10/2012 | Montoya | ................. | H04W 4/21 |
| | | | | 709/204 |
| 2012/0290977 A1* | 11/2012 | Devecka | ................ | G06Q 10/10 |
| | | | | 715/810 |
| 2013/0007864 A1* | 1/2013 | Puflea | ..................... | G06F 21/33 |
| | | | | 726/7 |
| 2014/0051402 A1* | 2/2014 | Qureshi | ................... | H04L 51/38 |
| | | | | 455/413 |
| 2016/0192315 A1* | 6/2016 | Paek | ....................... | H04W 4/02 |
| | | | | 455/456.1 |
| 2018/0146014 A1* | 5/2018 | Arzunian | .............. | H04W 76/10 |
| 2018/0233011 A1* | 8/2018 | Conti | ..................... | H04L 51/24 |
| 2018/0309801 A1* | 10/2018 | Rathod | ................ | H04L 67/141 |

FOREIGN PATENT DOCUMENTS

| | | |
|---|---|---|
| JP | 2010-140245 A | 6/2010 |
| JP | 2010-224842 A | 10/2010 |
| JP | 2015-133651 A | 7/2015 |

\* cited by examiner

FIG. 5
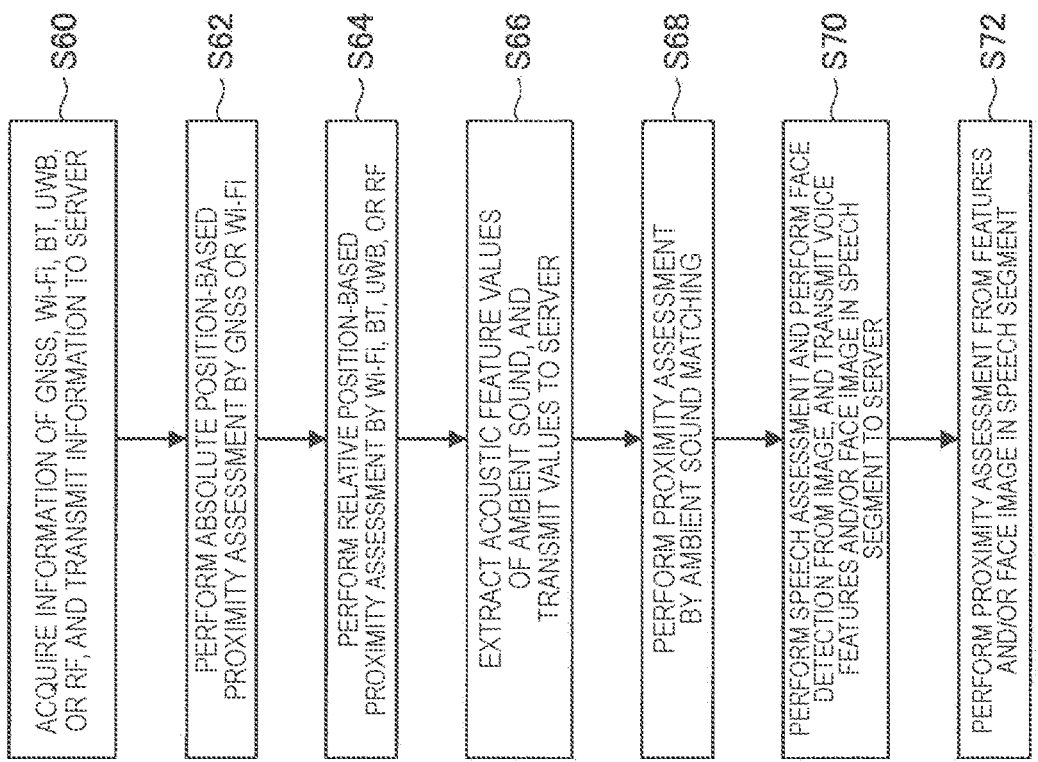
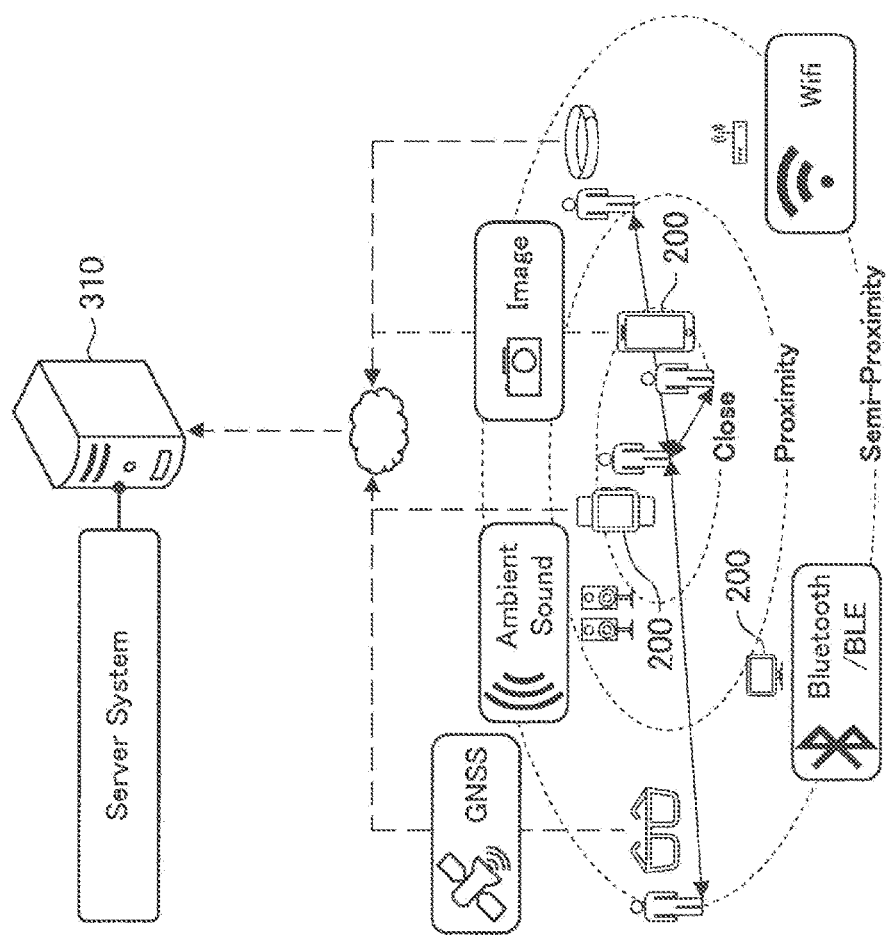

FIG. 6
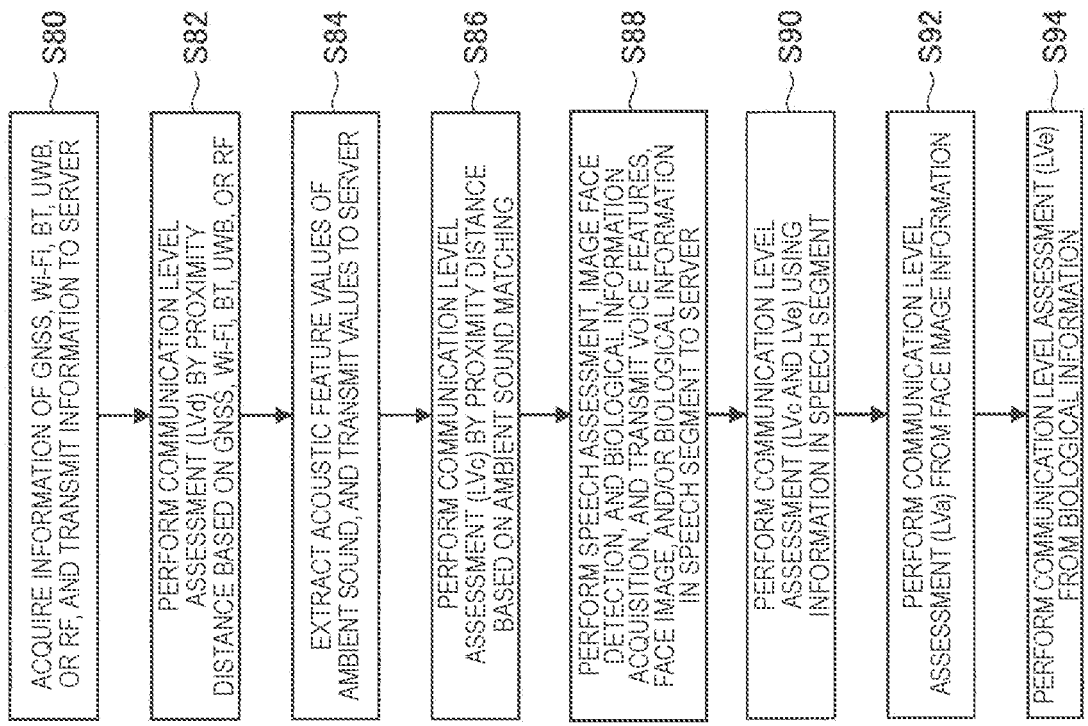
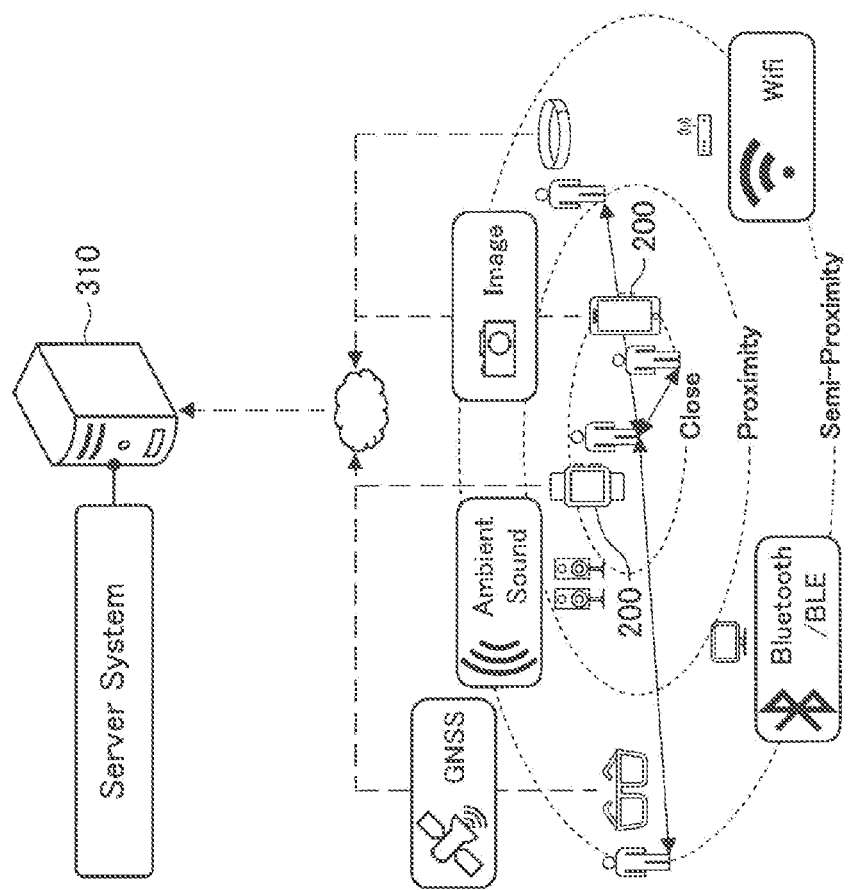

FIG. 9

FIG. 12
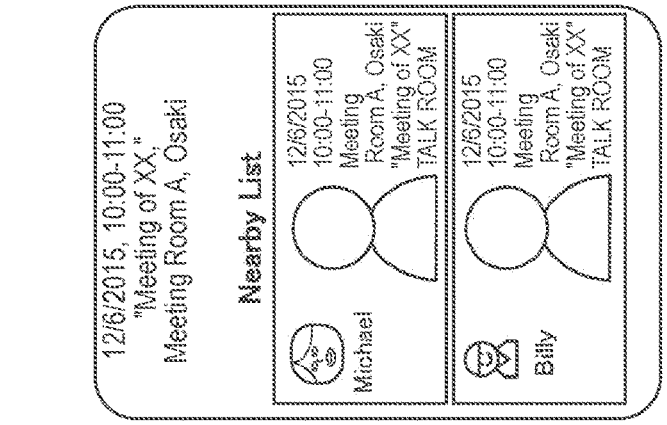
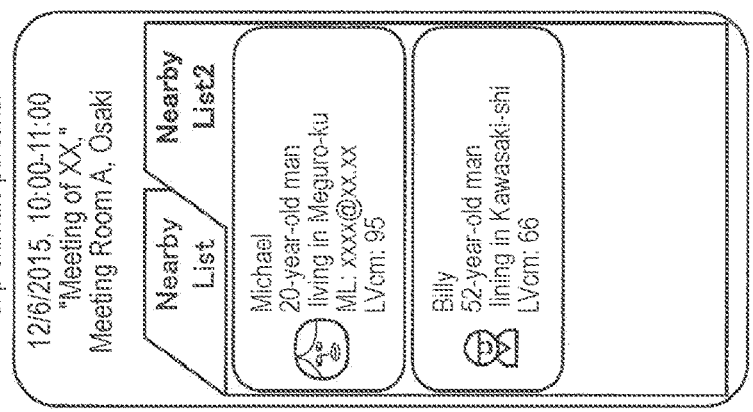
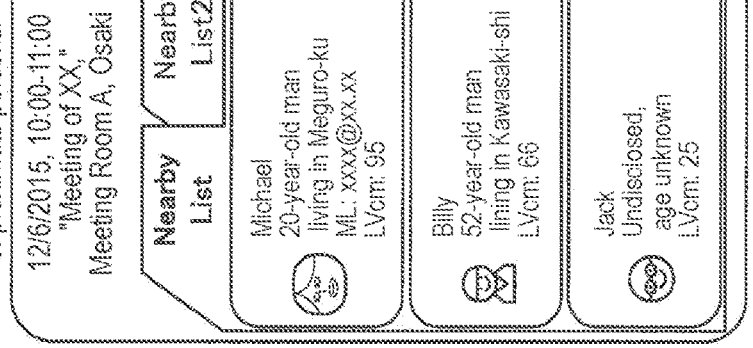

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/013070 filed on Mar. 29, 2017, which claims priority benefit of Japanese Patent Application No. JP 2016-100684 filed in the Japan Patent Office on May 19, 2016. Each of the above-referenced applications is hereby incorporated herein by reference in its entirety.

TECHNICAL FIELD

The present disclosure relates to an information processing apparatus, an information processing method, and a program.

BACKGROUND ART

Thus far, for example, Patent Literature 1 below describes a chat system with which a chat room that oneself can participate in can be managed in a unified way on the client apparatus side.

CITATION LIST

Patent Literature

Patent Literature 1: JP 2010-224842A

DISCLOSURE OF INVENTION

Technical Problem

In a case where, for example, a plurality of persons gather in a meeting such as an event or a social gathering, later communication can be performed if a chat room (a talk room) is created after the event, social gathering, or the like ends.

However, a person participating in an event, a social gathering, or the like does not converse with all the persons on the spot, but usually converses with congenial persons or persons who have become friends on the spot. Hence, if persons who did not converse in an actual event or an actual social gathering enter a chat room created afterward, a person does not recognize another person; consequently, it is presumed that there are few opportunities where mutual communication is performed using a chat room.

Thus, a mechanism that can create a talk room afterward with a person the user actually talked with on the spot has been desired.

Solution to Problem

According to the present disclosure, there is provided an information processing apparatus including: a communication level acquisition unit configured to acquire a level of mutual communication between users; and a talk room control unit configured to create a talk room that a plurality of users access via terminals in order to provide or acquire information, on a basis of the level.

In addition, according to the present disclosure, there is provided an information processing method including: acquiring a level of mutual communication between users; and creating a talk room that a plurality of users access via terminals in order to provide or acquire information, on a basis of the level.

In addition, according to the present disclosure, there is provided a program for causing a computer to function as: a means for acquiring a level of mutual communication between users; and a means for creating a talk room that a plurality of users access via terminals in order to provide or acquire information, on a basis of the level.

Advantageous Effects of Invention

As described above, according to the present disclosure, it becomes possible to provide a mechanism that can create a talk room afterward with a person the user actually conversed with on the spot. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a schematic diagram showing an example in which proximity assessment is performed in cooperation with a proximity assessment server.

FIG. 6 is a schematic diagram showing an example in which communication level assessment is performed in cooperation with a proximity assessment server.

FIG. 9 is a schematic diagram showing an example in which a talk room is set.

FIG. 12 is a schematic diagram showing an example in which switching of an SNS is performed in a talk room.

MODE(S) FOR CARRYING OUT THE INVENTION

Figure 1:
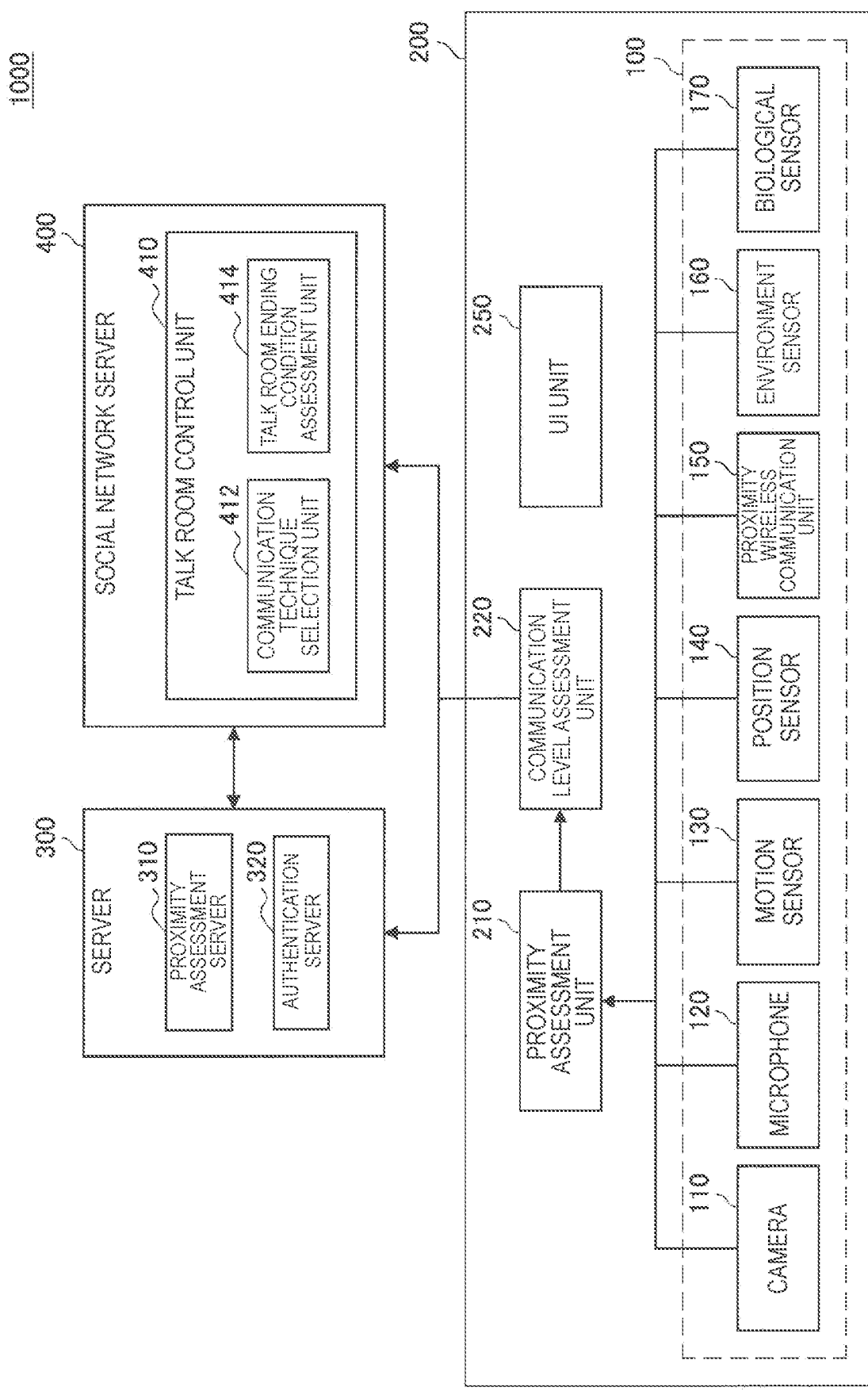
FIG. 1 is a schematic diagram showing a configuration example of a system according to the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of system
2. Configuration example of system
3. Technique for proximity assessment
4. Technique for communication level assessment
5. Processing performed in system of present embodiment
6. Specific examples of processing of proximity assessment
7. Specific example of communication level assessment
8. Sequence for profile information sharing
9. Examples of screen display of talk room
10. Talk room ending assessment
1. Overview of System In the present embodiment, a group is created automatically between users who have approached or communicated in the real world, on a social network service (SNS) on the Internet. Then, there is provided a system in which information sharing is allowed in the group for a certain period of time after that, and the group is deleted automatically in a case where there is no explicit instruction from a user.

Users are detected by proximity technology, and a group is created automatically in units of one event; thereby, a talk room (a chat space) in which information can be shared in the group is created. If a certain time has elapsed after the event of the group had ended, the talk room of the group disappears. Thus, a new communication tool with which encounters in the real world are reflected automatically in a virtual space, with consideration of the privacy of users, can be obtained.

The type of a talk room on a network service (a communication technique) is selected automatically during an event in the real world in which a plurality of users participate, in accordance with conditions of proximity between users (for example, the distance, a signal level, a communication level, etc.); and communication is enabled under certain conditions.

"The communication level," which is one of the conditions of proximity between users, is found from context between users during an event in the real world, such as warming-up of conversation (the amount of speech, laughter, or the degree of smiling), the degree of action coincidence (running together or playing tennis), and emotion (the level of affection from biological information).

As the type of the talk room, a social network service itself, the type of messages usable on this service (stamps, text chat, voice, video chat, presence sharing, photograph sharing, biological information sharing, or action reproduction with avatars), etc. are given.

Also certain conditions under which communication is possible are automatically settled by conditions of proximity between users during an event. Further, certain conditions may change gradationally.

2. Configuration Example of System

FIG. 1 is a schematic diagram showing a configuration example of a system 1000. As shown in FIG. 1, the system 1000 includes a terminal 200, a server 300, and a social network server 400.

As an example, the terminal 200 is a smartphone, a tablet terminal, or a wearable terminal such as an HMD. The terminal 200 includes various sensors 100, a proximity assessment unit 210, a communication level assessment unit 220, and a user interface (UI) unit 250. Note that, among the components of the terminal 200, the proximity assessment unit 210 and the communication level assessment unit 220 may be provided on the server 200 side.

Further, the server 300 may include a proximity assessment server 310 and an authentication server 320. In a case where the proximity assessment unit 210 is provided on the server 200 side, the proximity assessment unit 210 is provided in the proximity assessment server 310. The proximity assessment server 310 and the authentication server 320 may be separate bodies.

The terminal 200 can communicate with each of the server 300 and the social network server 400. The method for communication may be various methods by wire or wireless, and is not particularly limited.

The social network server 400 provides all social network services to the terminal 200. In particular, in the present embodiment, the social network server 400 provides a talk room to the terminal 200. Hence, the social network server 400 includes a talk room control unit 410. The talk room control unit 410 includes a communication level acquisition unit 411, a communication technique selection unit 412, and a talk room ending condition assessment unit 414. Note that the social network server 400 may be integrated with the server 300.

The talk room control unit 410 creates a talk room after a meeting such as an event in which users perform actual conversations ends, in accordance with the communication level. Hence, the communication level acquisition unit 411 acquires the communication level assessed by the communication level assessment unit 220. The communication technique selection unit 412 selects a technique for communication in accordance with the communication level. The talk room ending condition assessment unit 414 assesses whether a condition for ending the talk room has occurred or not; in a case where a condition for ending the talk room has occurred, the talk room control unit 410 causes the talk room to end. The talk room control unit 410 transmits information regarding the created talk room to the terminal 200. On receiving the information regarding the talk room, the terminal 200 causes the talk room to be displayed on the UI unit 250.

Among the components shown in FIG. 1, each of those except the various sensors 100 may include a circuit (hardware), or a central arithmetic processing device such as a CPU and a program (software) for causing the central arithmetic processing device to work. Further, the program may be recorded on a recording medium such as a memory included in the terminal 200 or the server 300 or 400, or on a recording medium connected to these devices from the outside.

The various sensors 100 include a camera 110, a microphone 120, a motion sensor 130, a position sensor 140, a proximity wireless communication unit 150, an environment sensor 160, and a biological sensor 170. Proximity assessment by the proximity assessment unit 210 is performed in accordance with results of detection by the various sensors 100. Here, the camera 110 may be a stereo camera; in this case, the distance to a subject (the other side of conversation) can be acquired on the basis of the parallax between the left and right images.

The motion sensor 130 includes an acceleration sensor, a gyro sensor, a vibration sensor, etc. The position sensor 140 performs position detection by a technique such as the GPS or Wi-Fi. The proximity wireless communication unit 150 performs wireless communication with the server 300 or other terminals 200 by Bluetooth (registered trademark), NFC, or the like. The environment sensor 160 acquires information of the terrestrial magnetism, barometric pressure, humidity, temperature, etc. The biological sensor 170 acquires biological information of the heart rate, the blood flow volume, the size of the pupil, etc. of the user.

The user interface (UI) unit 250 includes, as an example, a touch panel including a liquid crystal display and a touch sensor.

The proximity assessment unit 210 assesses whether an arbitrary plurality of users are in a proximate position or not. Specifically, the proximity assessment unit 210 assesses, in regard to a plurality of users, (A) whether they are within the range of a certain distance or not, (B) whether they are in the same facility or not, (C) whether they are participating in the same event or not, (D) whether they have had a face-to-face conversation or not, etc.

3. Technique for Proximity Assessment

The proximity assessment unit 210 performs proximity assessment on the basis of information obtained from the various sensors 100. The following are given as assessment techniques in the proximity assessment unit 210.

Absolute Position-Based Assessment Using a Global Navigation Satellite System (GNSS), Wi-Fi, or the Like In this method, proximity assessment is performed by (a) calculating the distance between users from the positioning coordinates (information of the latitude, longitude, and altitude) of each user. Further, (b) mapping positioning coordinates on map information of sections of facilities etc. and performing assessment with consideration of whether users are in the same facility or not is performed. Further, assessment can be performed also by (c) referring to the facilities of events and the times of events that are obtained from the calendar, schedule, event information on the Web, etc. of each user, in combination with (a) and (b) above. For example, in a case where an event is written on a schedule of a user, whether the user is in the facility of the event (the meeting place) or not can be distinguished from event information and the time instant.

Relative Position-Based Assessment Using Information Obtained from Communication of Wi-Fi, Bluetooth (Registered Trademark) (BT), Ultra-Wide Band (UWB), RF, or the Like, or Images In this method, assessment is performed by (a) calculating the distance between users (the distance between relative position coordinates) by a time-of-flight (TOF) method (TOA method) or a received signal strength indicator (RSSI) radio level. In a case where information obtained from images is used, the distance to the other side of conversation can be found from the parallax between the left and right images in stereo images, as described above. Further, (b) performing assessment with consideration of whether users are in the same facility or not, on the basis of map information of sections of facilities etc. and information obtained from proximity sensors installed on the facility sides, is performed. Further, assessment can be performed also by (c) referring to the facilities of events and the times of events that are obtained from the calendar, schedule, event information on the Web, etc. of each user, in combination with (a) and (b) above.

Proximity Assessment by Ambient Sound Matching

Proximity is assessed from the possibility of the same sound source on the basis of a correlation between acoustic feature values of ambient sounds recorded by the microphones 120 of the terminals 200 of users.

Person Detection Using Images

From image information recorded by the camera 110 of the terminal 200 of each user, whether there is a person to be faced or not and who the faced person is are assessed by face identification and human body identification. By this method, all the pieces of assessment of (A) to (D) mentioned above can be performed.

Proximity Assessment with Motion Sensor or Environment Sensor

Whether users are performing the same motion or not, whether users are on the same moving body or not, whether users are in the same environment facility or not, etc. are assessed on the basis of a correlation between feature values acquired by the motion sensors 130 and the environment sensors 160 of the terminals 200 of the users. Thereby, particularly the pieces of assessment of (B) and (C) mentioned above can be performed.

In a case where each terminal 200 includes the proximity assessment unit 210, terminals 200 exchange the various pieces of information described above and the pieces of identification information (ID) of the terminals 200; thereby, the proximity assessment unit 210 of each terminal 200 performs proximity assessment. Further, in a case where the proximity assessment unit 210 is provided in the server 300, each terminal 200 sends the various pieces of information described above to the server 300, and the proximity assessment unit 210 of the server 300 performs proximity assessment. For example, in a case of person detection based on images, each terminal 200 sends the face information of the owner of the terminal 200 registered in the terminal 200 and the identification information (ID) of the terminal 200 to other terminals 200. Thus, each terminal 200 compares the face information of the faced person photographed by the camera 110 and the face information sent from another terminal 200; in a case where both coincide, the former terminal 200 can assess that it is proximate to the latter terminal 200, which has sent the coinciding face image and identification information (ID). Further, in a case where proximity is assessed on the server 300 side, for example, the face information of the owner of each terminal 200 registered in the terminal 200 and the face information of the faced person photographed by the camera 110 of the terminal 200 are sent to the server 300 along with the identification information (ID) of each terminal 200. On the server 300 side, if face information photographed by a first terminal 200 and face information registered by a second terminal 200 coincide, it can be assessed that the first terminal 200 and the second terminal 200 are proximate.

4. Technique for Communication Level Assessment

The communication level assessment unit 220 assesses the degree of intimacy, the degree of warming-up, and the degree of importance between proximate users under proximity conditions. In a case where proximity assessment is performed by the proximity assessment unit 210, the communication level assessment unit 220 estimates the communication level $LVcm(i, j)=F(LVd(i, j), LVa(i, j), LVc(i, j), LVe(i, j))$ by using examples of assessment technique shown below. Note that F represents a prescribed function, and (i, j) represents "between arbitrary users, (i-j)."

Proximity Distance (Signal Level): $LVd(i, j)$ (Level of Distance)

The distance between users (i-j) is estimated by the proximity distance estimation in proximity assessment described above (estimation by GNSS high-accuracy positioning, UWB, TOA technique with a laser, Wi-Fi, or trilateration of APs, etc.).

Direction of the Face, the Line of Sight, the Attitude, the Gesture, Etc.: $LVa(i, j)$ (Level of Attention)

The face, the line of sight, and the attitude of a proximate user (j) are estimated from image information recorded by the terminal 200 of a user (i), and the level of attention to the user (i) from the faced person (j) is estimated.

Presence or Absence, the Frequency, the Total Time, Etc. Of Conversation: LVc(i, j) (Level of Conversation)

The presence or absence, the frequency, the total time, and the content of conversation with a proximate user (j) are estimated from acoustic information recorded by the terminal 200 of each user (i), and the level of conversation between the user (i) and the faced person (j) is estimated.

Laughter, Shouts of Joy, Affection (the Degree of Concentration), the Degree of Excitement, Etc.: LVe(i, j) (Level of Emotion)

The degree of warming-up, the degree of concentration, and the degree of excitement in a state of being proximate to a proximate user (j) are estimated from image information, acoustic information, biological information of sweating, heartbeats, the concentration of secretions in blood, brain waves, etc., and motion information recorded by the terminal 200 of each user (i), and the level of emotion of the user (i) to the faced person (j) is estimated.

A communication technique selection unit 230 automatically selects the type of the talk room (the type of the SNS or a communication technique) on the network service in accordance with a condition of proximity between proximate users (the communication level LVcm(i, j)). For example, in the following way, the communication technique selection unit 230 selects the type of the talk room in accordance with the communication level LVcm(i, j).
Examples of the type of the talk room and conditions:
LVcm≥X0: exchange of stamps
LVcm≥X1>X0: text chat
LVcm≥X2>X1: voice chat
LVcm≥X3>X2 && LVa>Y0: video chat
LVcm≥X4>X3 && LVc>Y1: presence sharing or position sharing
LVcm≥X5>X4 && LVe>Y2: biological information sharing
LVcm≥X6>X5: a virtual space Further, the type of the talk room may be varied in accordance with the transport means (the action, the type of the conveyance, and the speed) after the event. For example, in cases of walking and vehicle locomotion, it is difficult to see the display screen of the terminal 200; thus, the type is set to participation in a talk room by voice. On the other hand, in a case of train locomotion, voice is less likely to be uttered; thus, the type is set to participation in a talk room by text input. Further, during a stay, the type is set to participation in a talk room by video chat.

5. Processing Performed in System of Present Embodiment

Figure 2:
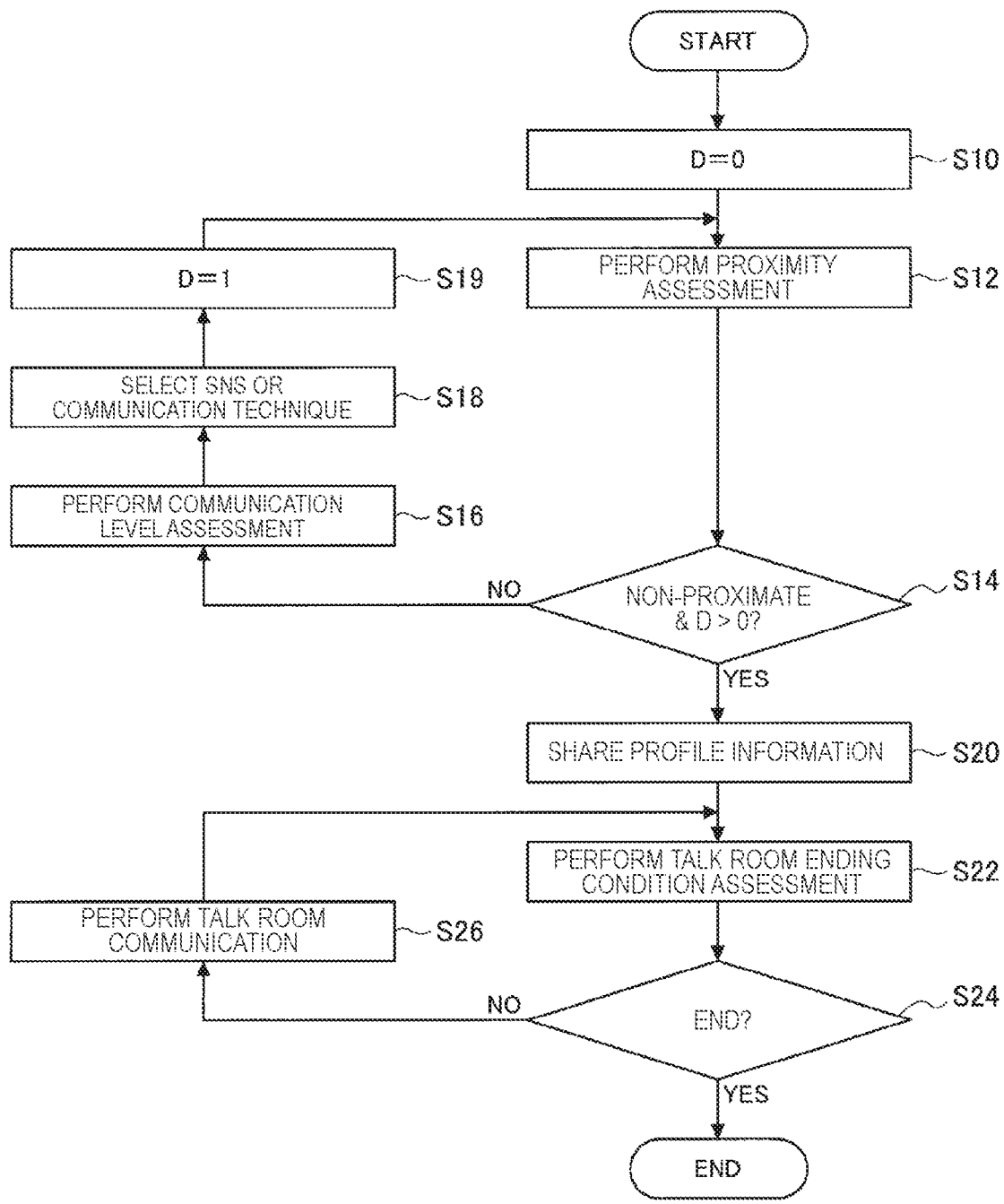
FIG. 2 is a flow chart showing processing performed in the system.

FIG. 2 is a flow chart showing processing performed in the system 1000. First, in step S10, the value of a flag D is set to D=0. In the next step S12, the proximity assessment unit 210 performs proximity assessment. In the next step S14, whether the situation is not proximity and furthermore D>0 or not is assessed; in a case where this condition does not hold, that is, in a case where the situation is proximity or D=0, the procedure goes to step S16. In step S16, the communication level assessment unit 220 performs the assessment of the communication level. In the next step S18, an SNS or a technique for communication is selected on the basis of the communication level LVcm(i, j). In the next step S19, D is set to D=1. After step S19, the procedure returns to step S12.

Thus, if the processing of steps S16 and S18 is performed, D is set to D=1; in a case where in the processing of the subsequent step S14 it is assessed that the situation is not proximity, the procedure goes to the processing of step S20 and the subsequent steps, due to D=1. On the other hand, in a case where the processing of steps S16 and S18 has not been performed, D=0; hence, the procedure goes to the processing of step S16 and the subsequent steps as a result of the assessment of step S14. There is no case where the procedure goes to the processing of step S20 and the subsequent steps in a state where the processing of step S16 and S18 has not been performed.

Further, in a case where the condition of step S14 holds, the procedure goes to step S20. In this case, since users are not proximate, a meeting such as an event in which the users actually met and performed communication has ended; thus, after that, the processing of creating a talk room and the processing of ending the talk room are performed. In step S20, profile information is shared between users. In the next step S22, a condition for ending the talk room is assessed. In the next step S24, whether to end the talk room or not is assessed on the basis of the result of assessment of step S22; in a case of ending, the processing is ended (END). On the other hand, in a case where the talk room is not ended, the procedure goes to step S26. In step S26, users perform communication by means of the talk room. After step S26, the procedure returns to step S22, and a condition for ending the talk room is assessed again.

6. Specific Examples of Processing of Proximity Assessment

Figure 3:
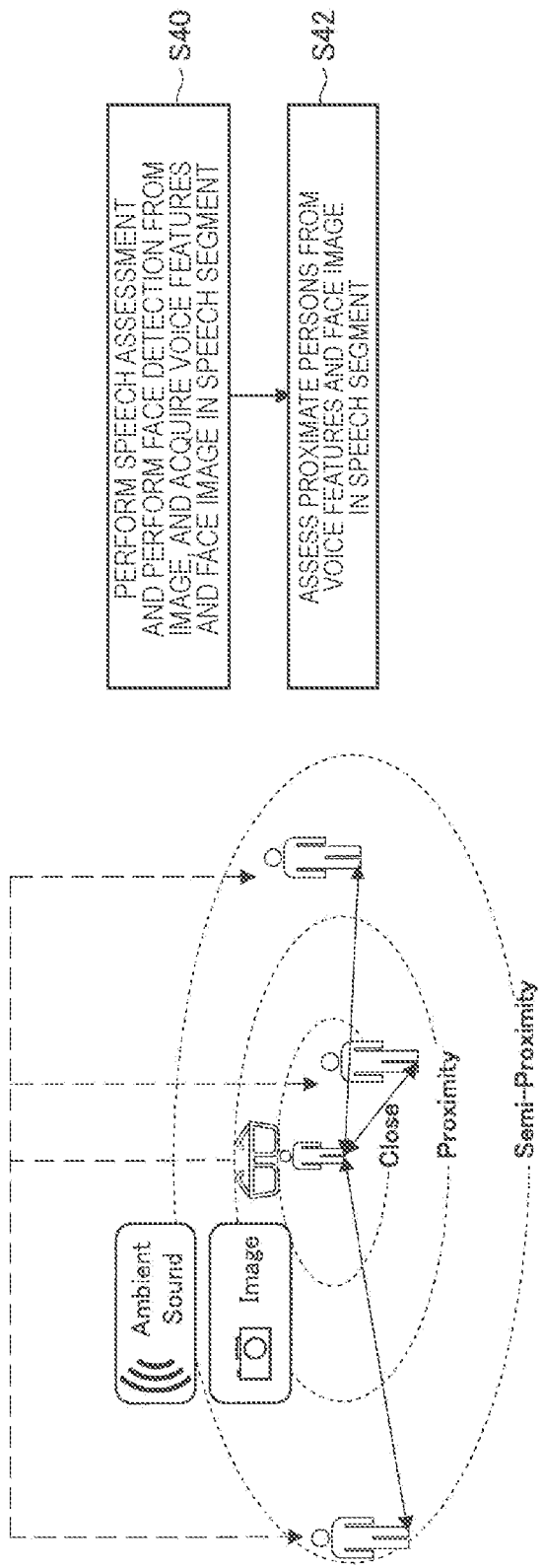
FIG. 3 is a schematic diagram showing an example in which proximity assessment is performed by P2P communication between terminals.

Next, specific examples of proximity assessment are described. FIG. 3 is a schematic diagram showing an example in which proximity assessment is performed by P2P communication between terminals 200. In this example, terminals 200 are connected together, with no server interposed. First, in step S40, speech assessment is performed on the basis of voice information acquired by the microphone 120, and face detection is performed from image information acquired by the camera 110; during a speech segment, voice feature information and/or face image information is acquired. In the next step S42, proximate persons are assessed from the voice feature information and/or the face image information in the speech segment. Note that, in each terminal 200, the voice feature information and/or the face image information of other terminals 200 is registered along with terminal IDs in advance; and the voice feature information and/or the face image information of the other side of communication acquired by P2P communication is compared; thus, proximate persons are assessed on the basis of the result of comparison. In this way, proximity assessment can be performed by P2P communication between terminals 200 without using a server.

Figure 4:
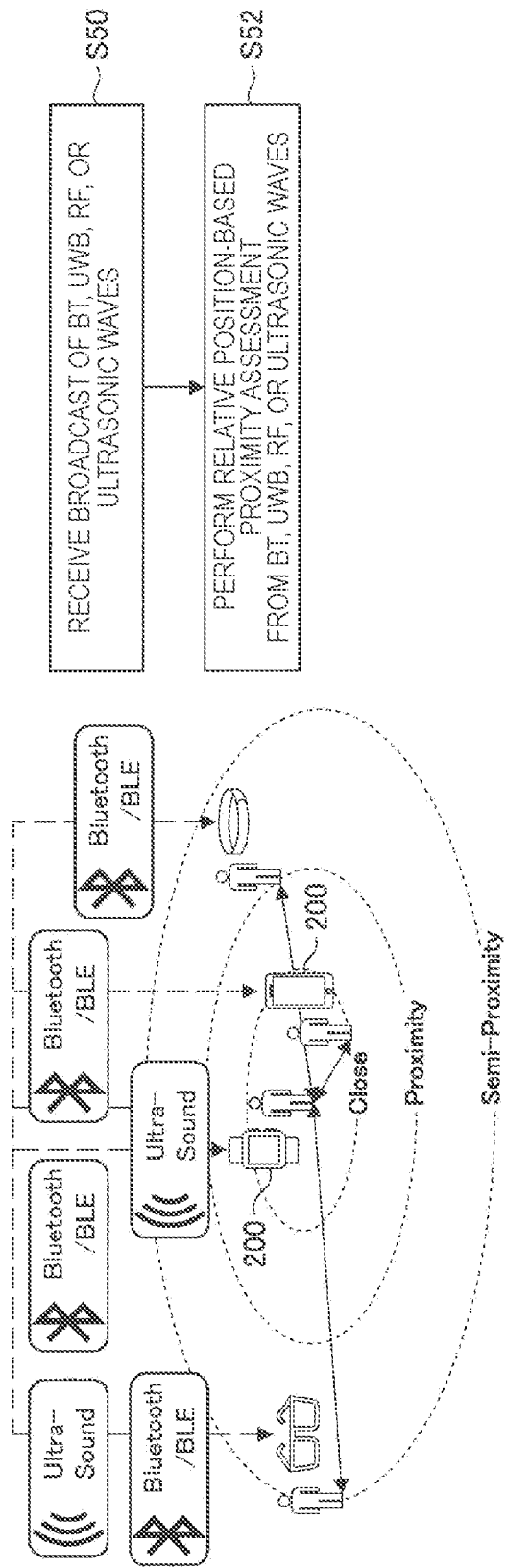
FIG. 4 is a schematic diagram showing another example in which proximity assessment is performed by P2P communication between terminals.

FIG. 4 is a schematic diagram showing another example in which proximity assessment is performed by P2P communication between terminals 200. First, in step S50, each terminal 200 receives a broadcast by means of BT, UWB, RF, ultrasonic waves, or the like. In the next step S52, the relative position to the terminal 200 of the other side of communication is found by BT, UWB, RF, ultrasonic waves, or the like, and proximity assessment is performed.

FIG. 5 is a schematic diagram showing an example in which proximity assessment is performed in cooperation with the proximity assessment server 310. First, in step S60, each terminal 200 acquires at least one of pieces of information of a GNSS, Wi-Fi, BT, UWB, or RF, and transmits the information to the proximity assessment server 310. In the next step S62, the proximity assessment server 310 performs absolute position-based proximity assessment by the GNSS or Wi-Fi. In the next step S64, the proximity assessment server 310 performs relative position-based proximity assessment by Wi-Fi, BT, UWB, or RF. In the next step S66, each terminal 200 extracts acoustic feature values of ambient sound acquired by the microphone 120, and transmits the values to the proximity assessment server 310. In the next step S68, the proximity assessment server 310 performs proximity assessment by ambient sound matching. In the next step S70, each terminal 200 performs speech assessment on the basis of voice information acquired by the microphone 120, and performs face detection from image information acquired by the camera 110; and transmits voice feature information and/or face image information to the proximity assessment server 310 during a speech segment. In the next step S72, the proximity assessment server 310 assesses proximate persons from the voice feature information and/or the face image information in the speech segment. Note that there is no need to perform all the pieces of proximity assessment shown in FIG. 5.

7. Specific Example of Communication Level Assessment

FIG. 6 is a schematic diagram showing an example in which communication level assessment is performed in cooperation with the proximity assessment server 310. First, in step S80, each terminal 200 acquires at least one of pieces of information of a GNSS, Wi-Fi, BT, UWB, or RF, and transmits the information to the proximity assessment server 310. In the next step S82, the proximity assessment server 310 performs communication level assessment (LVd) by proximity assessment by the GNSS or Wi-Fi. In the next step S84, each terminal 200 extracts acoustic feature values of ambient sound acquired by the microphone 120, and transmits the values to the proximity assessment server 310. In the next step S86, the proximity assessment server 310 performs communication level assessment (LVc) by proximity assessment by ambient sound matching. In the next step S88, each terminal 200 performs speech assessment, image face detection, and biological information acquisition, and transmits voice features, a face image, and/or biological information in a speech segment to the proximity assessment server 310. In the next step S90, the proximity assessment server 310 performs communication level assessment (LVc and LVe) using the voice features in the speech segment transmitted in step S88. In the next step S92, the proximity assessment server 310 performs communication level assessment (LVa) from the face image information transmitted in step S88. In the next step S94, the proximity assessment server 310 performs communication level assessment (LVe) from the biological information transmitted in step S88.

8. Sequence for Profile Information Sharing

After both-side devices satisfy a proximity condition in proximity assessment, information of the users' profiles held by the both-side devices is shared; thereby, setting for establishing the communication service of a talk room after the proximity condition is over is made.

Figure 7:
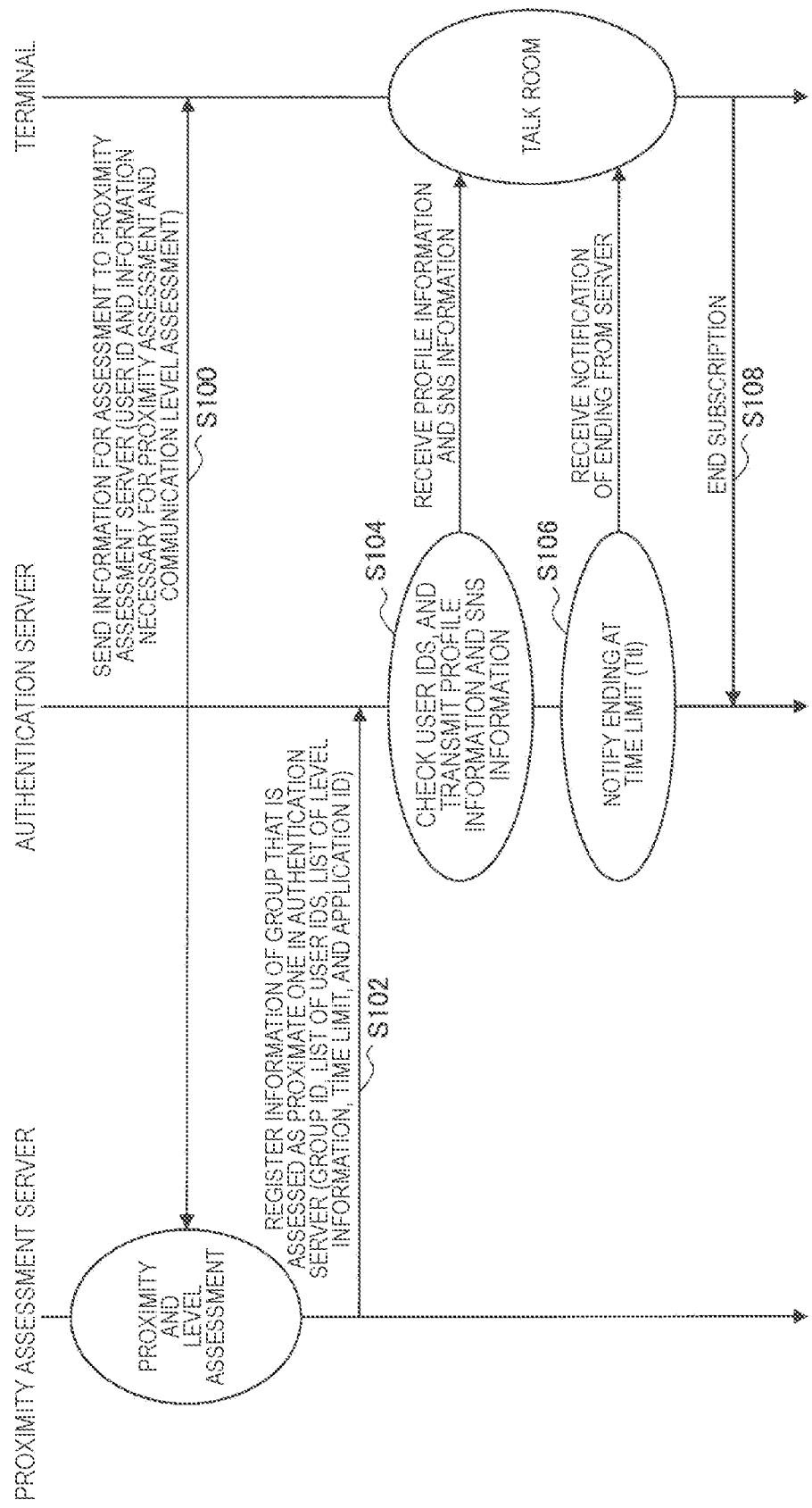
FIG. 7 is a schematic diagram showing a sequence at a time of sharing profile information in step S20 of FIG. 2.

FIG. 7 is a schematic diagram showing a sequence at the time of sharing profile information in step S20 of FIG. 2. Herein, a description is given using a case where the proximity assessment server 310 performs proximity assessment, as an example. First, in step S100, subscription is started, and each terminal 200 sends information for proximity assessment to the proximity assessment server 310. The information for proximity assessment includes a user ID and information necessary for proximity assessment and communication level assessment. Note that the user ID is identification information assigned to the terminal 200 of each user.

In step S102, on the basis of the information sent from each terminal 200, the proximity assessment server 310 performs proximity assessment and communication level assessment, and registers information of a group that is assessed as one having a high communication level, in the authentication server 320. Here, as the information registered, profile information such as a group ID, a list of user IDs, a list of communication level information, a time limit, and an application ID is given.

In the next step S104, the authentication server 320 checks user IDs, and transmits profile information and SNS information to terminals 200; and each terminal 200 receives the profile information and the SNS information. The profile information is transmitted also to the social network server 400. Thereby, the talk room control unit 410 of the social network server 400 creates a talk room, and the access to the talk room from the terminal 200 of each user becomes possible. Here, since the profile information and the SNS information of the terminal 200 in accordance with the user ID are sent to the terminal 200 and the social network server 400, the viewing of a display screen and the sending of information based on the communication level LVcm like those described above become possible.

In the next step S106, if a time limit Ttl has passed, the authentication server 320 transmits a notification of ending to the terminal 200. The notification of ending is transmitted also to the social network server 400, and the talk room ending condition assessment unit 414 performs ending assessment. Thereby, the talk room ends. In the next step S108, the terminal 200 ends subscription.

Figure 8:
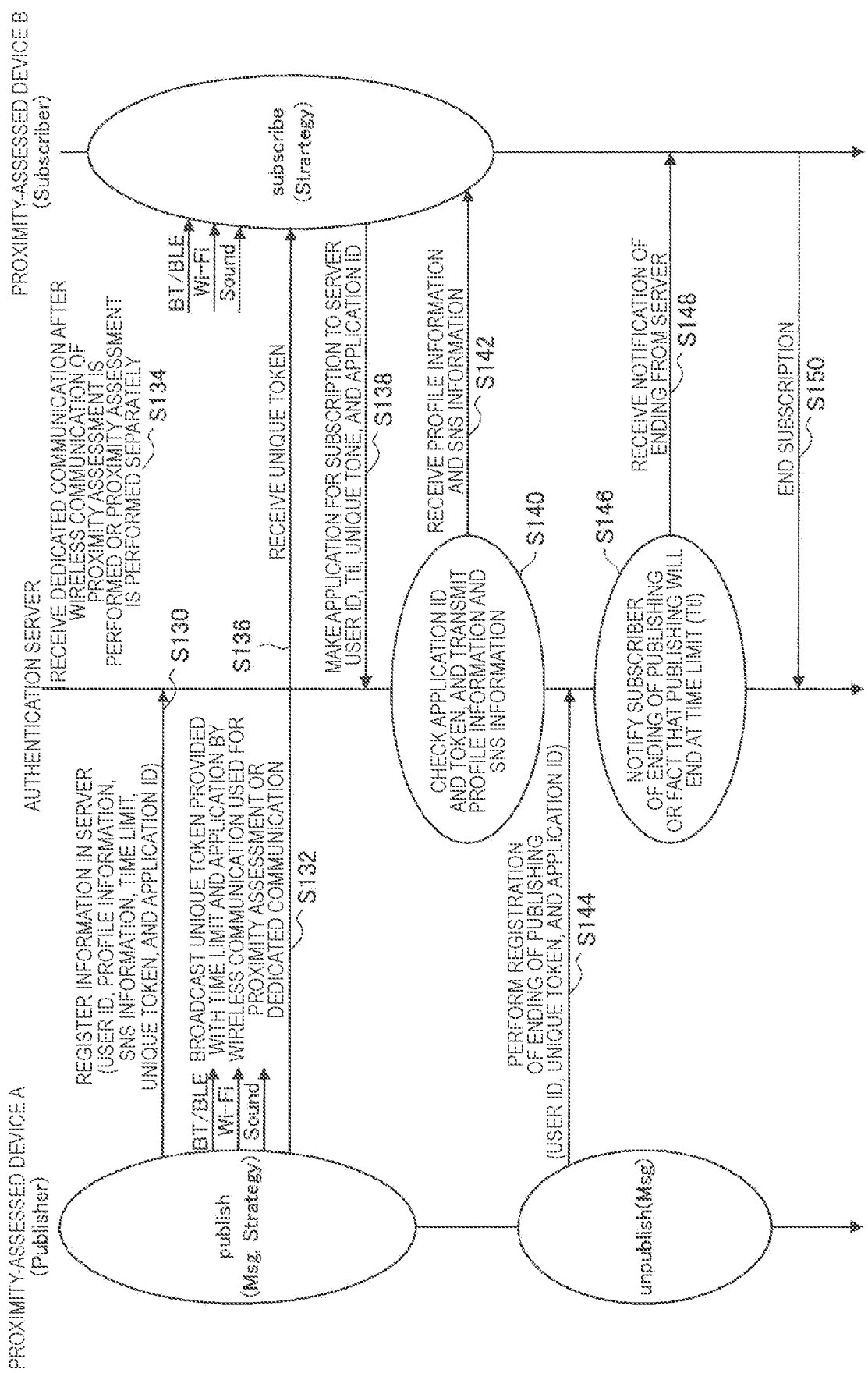
FIG. 8 is a schematic diagram showing another sequence at a time of sharing profile information.

FIG. 8 is a schematic diagram showing another sequence at the time of sharing profile information. A case where two terminals of a proximity-assessed device A and a proximity-assessed device B exist as terminals 200 will now be described. First, in step S130, the proximity-assessed device A registers information of a user ID, profile information, SNS information, a time limit, a unique token, an application ID, etc. in the authentication server 320. In the next step S132, the proximity-assessed device A broadcasts the unique token provided with the time limit and the application by wireless communication used for proximity assessment or dedicated communication.

In the next step S134, after wireless communication of proximity assessment is performed or proximity assessment is performed separately, the proximity-assessed device B receives dedicated communication. In the next step S136, the proximity-assessed device B receives the unique token. In the next step S138, the proximity-assessed device B sends a user ID, Ttl, a unique tone, and an application ID to the authentication server 320, and makes an application for subscription.

In the next step S140, the authentication server 320 checks the application ID and the token, and transmits the profile information and the SNS information; in the next step S142, the proximity-assessed device B receives the profile information and the SNS information.

In the next step S144, the proximity-assessed device A sends the user ID, the unique token, and the application ID to the authentication server 320, and performs the registration of the ending of publishing. In the next step S146, the authentication server 320 notifies the proximity-assessed device B of the ending of publishing or the fact that publishing will end at the time limit (Ttl); in the next step S148, the proximity-assessed device B receives the notification of ending. In the next step S150, the proximity-assessed device B causes subscription to end.

9. Examples of Screen Display of Talk Room

Figure 9:
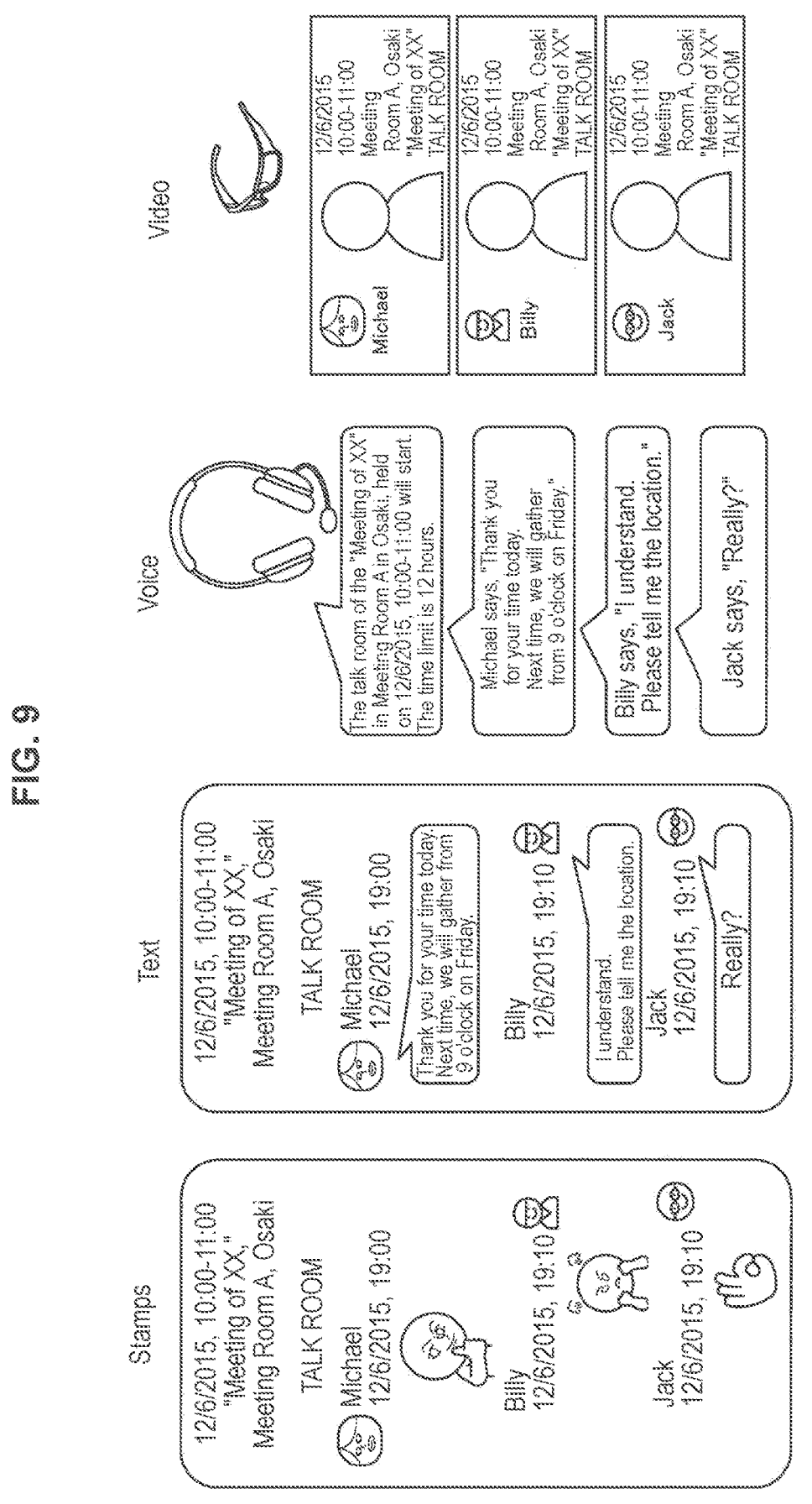

FIG. 9 is a schematic diagram showing an example in which a talk room is set by the talk room control unit 410. Herein, a state where three persons of Michael, Billy, and Jack are assessed as proximate persons and are participating in a talk room is shown, and a situation where each user performs communication by means of stamps, text, voice, and video (video messages) is shown. Note that, in the example of voice shown in FIG. 9, the time limit up to the end of the talk room is set to 12 hours, and the time limit is told to each user by reading-out voice by the system. In this example, the sound volume may be set to become smaller with passage of time to the time limit. Further, in the example of video, the resolution may be set to become lower with passage of time to the time limit.

Figure 10:
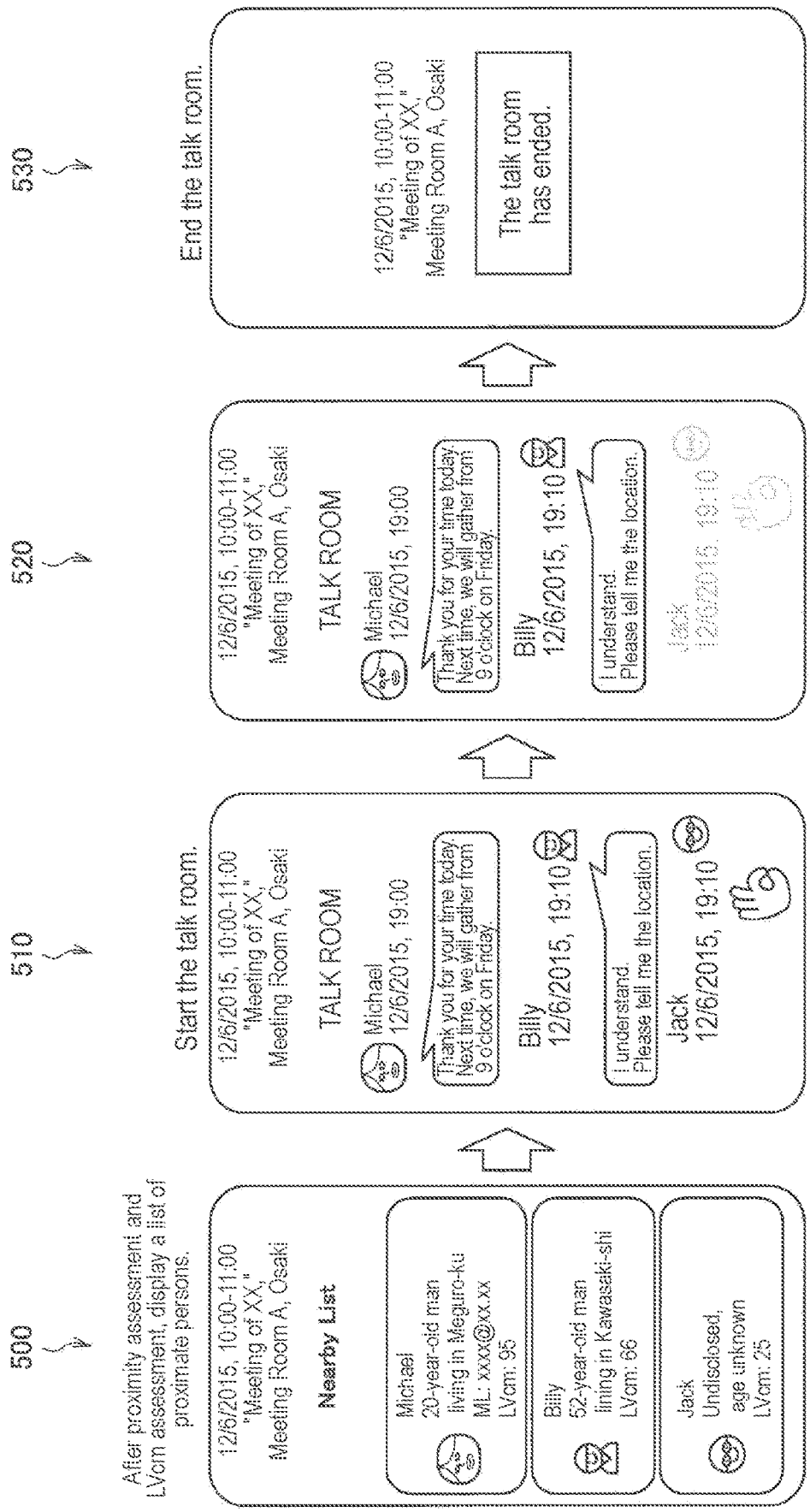
FIG. 10 is a schematic diagram showing a situation where information that is able to be seen in a talk room and information that is able to be sent in a talk room vary in accordance with a communication level LVcm.

FIG. 10 is a schematic diagram showing an example in which a talk room is set, and is a schematic diagram showing a situation where information that is able to be seen in the talk room and information that is able to be sent in the talk room vary in accordance with the communication level LVcm. First, as shown in screen 500, a technique for communication is selected on the basis of the communication level LVcm(i, j), and a list of proximate persons (nearby list) is displayed. Also herein, a case where three persons of Michael, Billy, and Jack are assessed as proximate persons is shown; and the example shown in FIG. 10 shows a display example in the terminal 200 of Michael.

In screen 500, three persons of Michael, Billy, and Jack become proximate in a gathering of "a meeting of XX," and thereby these three persons are displayed on a nearby list as proximate persons. As shown in screen 500, the communication level LVcm of Michael is 95, the communication level LVcm of Billy is 66, and the communication level LVcm of Jack is 25. In this case, Michael has a relatively high communication level LVcm, and therefore has a larger amount of profile information that is able to be seen in the talk room.

Screen 510 shows a state where a talk room has started. Since Michael has a high communication level LVcm, the sending method that he can select is text+stamps. On the other hand, since Jack has a low communication level LVcm, the sending method that he can select is only stamps.

Screen 520 shows a situation where a user with a small communication level LVcm disappears from the talk room after a certain time has elapsed. In this example, Jack has a low communication level LVcm, and consequently disappears from the talk room after a certain time has elapsed. On the other hand, Michael has a high communication level LVcm, and can therefore see the talk room up to the time limit that is set in the system.

Screen 530 shows a state where the talk room has ended. If the talk room ends, this fact is displayed, and the subsequent use of the talk room becomes impossible.

Figure 11:
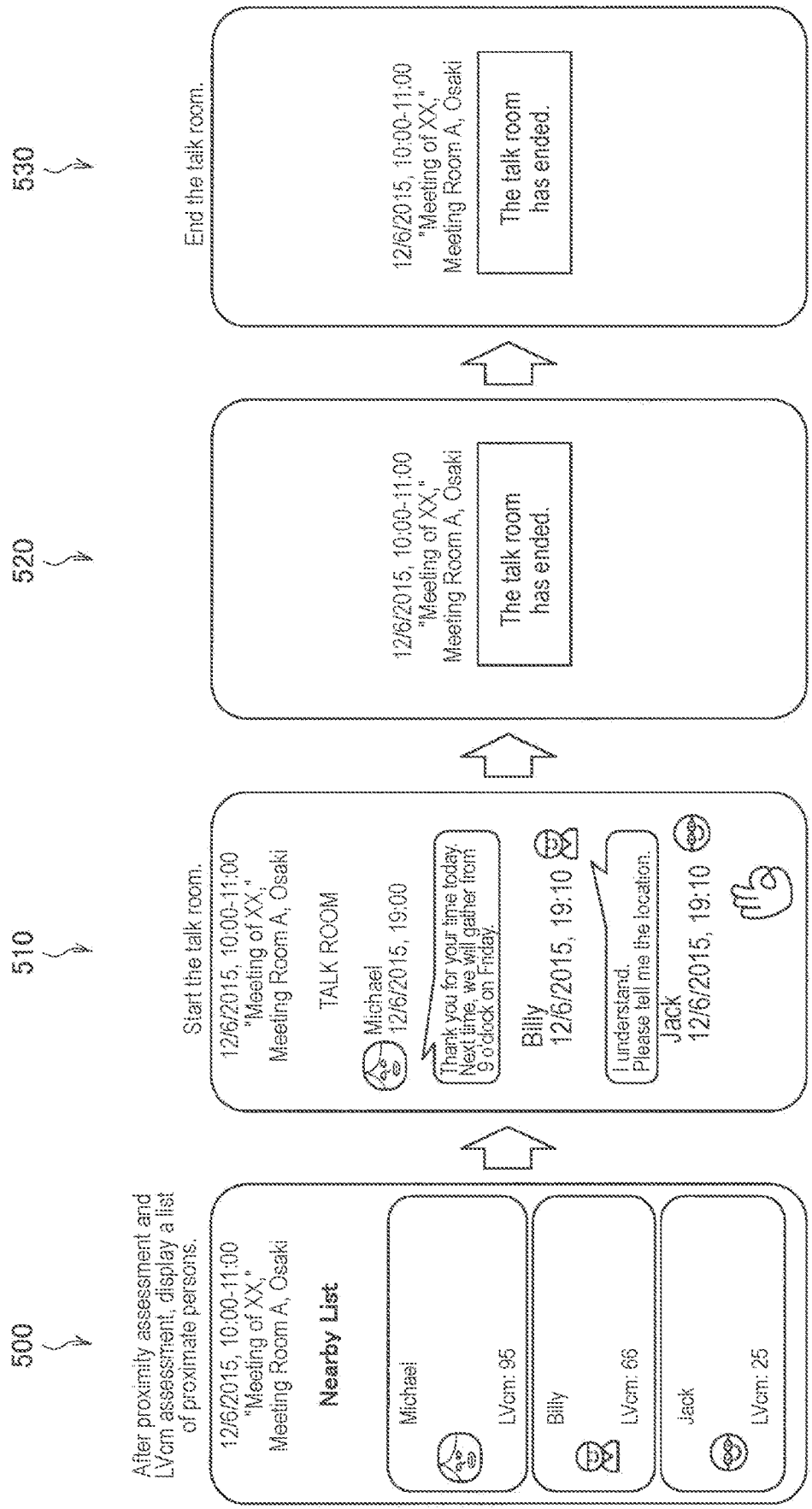
FIG. 11 is a schematic diagram showing a display example in a different terminal in the same talk room as FIG. 10.

FIG. 11 shows a display example in the terminal 200 of Jack in the same talk room as FIG. 10. Similarly to FIG. 10, first, as shown in screen 500, a technique for communication is selected on the basis of the communication level LVcm(i, j), and a nearby list of proximate persons is displayed. Here, in the display in the terminal 200 of Jack, since the communication level LVcm is low, only the names of Michael and Billy are displayed, and the addresses and the e-mail addresses of them are not displayed.

Similarly to FIG. 10, screen 510 of FIG. 11 shows a state where a talk room has started. Since Jack has a low communication level LVcm, the sending method that he can select is only stamps, and text input is not possible.

Screen 520 shows a situation where a user with a small communication level LVcm disappears from the talk room after a certain time has elapsed; since Jack has a low communication level LVcm, the message of "The talk room has ended" is displayed, and at this stage it becomes impossible for Jack to see the talk room. Screen 530 shows a display in the state where the talk room has ended. The display of screen 530 in the terminal 200 of Jack is similar to screen 520.

Thus, in a case where a talk room is created between users on which proximity assessment has been performed, information that is able to be seen in the talk room varies in accordance with the communication level LVcm of the user. Further, information that is able to be sent in the talk room varies in accordance with the communication level LVcm of the user.

FIG. 12 shows an example in which the switching of the SNS is performed in a talk room. Similarly to FIG. 10, first, as shown in screen 500, a technique for communication is selected on the basis of the communication level LVcm(i, j), and nearby list 1 of proximate persons is displayed. Next, screen 540 shows a situation where a stamp-based SNS is chosen, including a user with a low communication level LVcm. In this case, each user can perform communication by means of stamps.

Further, Michael and Billy have relatively high communication levels LVcm(i, j), and can therefore choose nearby list 2. In nearby list 2, as shown in screen 550, a technique for communication is selected on the basis of the communication level LVcm(i, j), and a list of proximate persons is displayed. Next, screen 560 shows a situation where a video chat-equipped SNS is chosen only by users with high communication levels LVcm. In this case, communication by video chat can be performed only by users with high communication levels LVcm (Michael and Billy).

10. Talk Room Ending Assessment

Next, the assessment of the ending of a talk room is described. In step S22 of FIG. 2, the ending of the talk room is assessed in accordance with whether a prescribed time has elapsed from the end of the event or not. In a case where a prescribed time has elapsed, the talk room is caused to end; the prescribed time may be varied in accordance with proximity conditions (the distance, the signal level, and the communication level) during the event. For example, the prescribed time until the talk room ends may be set in accordance with the communication level LVcm. As an example, the prescribed time=F(LVcm) [seconds].

Further, the type of the talk room may be varied gradationally in accordance with proximity conditions (the distance, the signal level, and the communication level) during the event. For example, the talk room is switched by the condition of LVcm≥X(D), with the increase in the distance D between both users. As an example, the talk room is switched like video→voice→text→stamps. Note that X represents a prescribed function.

Further, the prescribed time may be settled by a condition defined between proximate persons during the event. For example, the talk room may be caused to end at the time point when all the proximate persons set a schedule of the next participation. Further, the talk room may be caused to end at the time point when someone says a specific key word in the talk room. Further, the talk room may be caused to end at the time point when a user leaves a designated place area.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing apparatus including:
a communication level acquisition unit configured to acquire a level of mutual communication between users; and
a talk room control unit configured to create a talk room that a plurality of users access via terminals in order to provide or acquire information, on a basis of the level.

(2) The information processing apparatus according to (1),
in which the talk room control unit creates the talk room after a meeting in which users actually perform communication with each other ends.

(3) The information processing apparatus according to (1) or (2),
in which the talk room control unit ends the talk room in a case where a prescribed condition holds.

(4) The information processing apparatus according to any of (1) to (3),
in which the talk room control unit varies a condition for use of the talk room in accordance with the level of an individual user.

(5) The information processing apparatus according to (4),
in which the talk room control unit includes
a communication technique selection unit configured to select a technique for communication in the talk room in accordance with the level of an individual user.

(6) The information processing apparatus according to (4),
in which the talk room control unit sets, for a user of which the level is higher, a larger amount of information that is able to be acquired from the talk room.

(7) The information processing apparatus according to (4),
in which the talk room control unit sets, for a user of which the level is higher, a larger amount of information that is able to be provided to the talk room.

(8) The information processing apparatus according to any of (1) to (7), including:
a communication level assessment unit configured to assess the level.

(9) The information processing apparatus according to (8),
in which the communication level assessment unit assesses the level on a basis of at least one of a distance between users, a direction of a face of a user, a line of sight of a user, an attitude of a user, a motion of a user, voice of a user related to communication, or biological information of a user.

(10) The information processing apparatus according to (8),
in which the communication level assessment unit assesses the level in a case where users are proximate to each other in a meeting in which users actually perform communication with each other.

(11) The information processing apparatus according to (10), including:
a proximity assessment unit configured to assess whether users are proximate to each other or not.

(12) The information processing apparatus according to (1),
in which the talk room control unit creates the talk room on a basis of identification information of the terminals of users and the levels in such a manner that the terminal of which the level is more than or equal to a prescribed value is allowed to provide or acquire the information.

(13) An information processing method including:
acquiring a level of mutual communication between users; and
creating a talk room that a plurality of users access via terminals in order to provide or acquire information, on a basis of the level.

(14) A program for causing a computer to function as:
a means for acquiring a level of mutual communication between users; and
a means for creating a talk room that a plurality of users access via terminals in order to provide or acquire information, on a basis of the level.

REFERENCE SIGNS LIST 210 proximity assessment unit
220 communication level assessment unit
410 talk room control unit
411 communication level acquisition unit

The invention claimed is:

1. An information processing apparatus, comprising:
a central processing unit (CPU) configured to:
determine a communication level of each user of a plurality of users, wherein
the communication level of each user of the plurality of users indicates a degree of communication between a corresponding user of the plurality of users and users of the plurality of users other than the corresponding user; and
the communication level of each user of the plurality of users is determined based on sensor data indicating proximity between the corresponding user and the users other than the corresponding user;
create a talk room on a social network service based on an end of a meeting that involves communication between the plurality of users and the determined communication level of each user of the plurality of users, wherein
each of the plurality of users accesses the talk room via a corresponding user terminal of a plurality of user terminals to provide or acquire information; and
select a communication technique among a plurality of communication techniques for communication in the talk room, wherein
the selection is based on the communication level of each user of the plurality of users that exceeds a determined threshold, and
each communication technique of the plurality of communication techniques corresponds to a different mode of communication and a different amount of the information shared in the talk room.

2. The information processing apparatus according to claim 1, wherein the CPU is further configured to end the talk room based on a specific condition.

3. The information processing apparatus according to claim 1, wherein
the CPU is further configured to vary a condition for use of the talk room, and the condition is varied based on the communication level of each user of the plurality of users.

4. The information processing apparatus according to claim 3, wherein
the CPU is further configured to set, for each user of the plurality of users, amount of the information that is able to be acquired by each user of the plurality of users, and
the amount of the information is set based on the communication level of each user of the plurality of users.

5. The information processing apparatus according to claim 3, wherein
the CPU is further configured to set, for each user of the plurality of users, amount of the information that is able to be provided by each user of the plurality of users, and
the amount of the information is set based on the communication level of each user of the plurality of users.

6. The information processing apparatus according to claim 1, wherein the CPU is further configured to determine the communication level of each user of the plurality of users.

7. The information processing apparatus according to claim 6, wherein the CPU is further configured to determine the communication level of each user of the plurality of users based on at least one of a distance between the corresponding user of the plurality of users and the users of the plurality of users other than the corresponding user, a direction of a face of the corresponding user, a line of sight of the corresponding user, an attitude of the corresponding user, a motion of the corresponding user, voice of the corresponding user, or biological information of the corresponding user.

8. The information processing apparatus according to claim 6, wherein the CPU is further configured to determine the communication level of each user of the plurality of users based on the proximity between the plurality of users.

9. The information processing apparatus according to claim 8, wherein the CPU is further configured to determine the proximity between the plurality of users.

10. The information processing apparatus according to claim 1, wherein the CPU is further configured to:
create the talk room based on identification information of the plurality of users; and
enable a specific user of the plurality of users to provide or acquire the information, wherein the communication level of the specific user is more than or equal to determined threshold.

11. An information processing method, comprising:
determining a communication level of each user of a plurality of users, wherein
the communication level of each user of the plurality of users indicates a degree of communication between a corresponding user of the plurality of users and users of the plurality of users other than the corresponding user, and
the communication level of each user of the plurality of users is determined based on sensor data indicating proximity between the corresponding user and the users other than the corresponding user;
creating a talk room on a social network service based on an end of a meeting that involves communication between the plurality of users and the determined communication level of each user of the plurality of users, wherein each of the plurality of users accesses the talk room via a corresponding user terminal of a plurality of user terminals to provide or acquire information; and
selecting a communication technique among a plurality of communication techniques for communication in the talk room, wherein
the selection is based on the communication level of each user of the plurality of users exceeding a determined threshold, and
each communication technique of the plurality of communication techniques corresponds to a different mode of communication and a different amount of the information shared in the talk room.

12. A non-transitory computer-readable medium having stored thereon, computer-executable instructions which, when executed by a processor, cause the processor to execute operations, the operations comprising:
determining a communication level of each user of a plurality of users, wherein
the communication level of each user of the plurality of users indicates a degree of communication between a corresponding user of the plurality of users and users of the plurality of users other than the corresponding user, and
the communication level of each user of the plurality of users is determined based on sensor data indicating proximity between the corresponding user and the users other than the corresponding user;
creating a talk room on a social network service based on an end of a meeting that involves communication between the plurality of users and the determined communication level of each user of the plurality of users, wherein each of the plurality of users accesses the talk room via a corresponding user terminal of a plurality of user terminals to provide or acquire information; and
selecting a communication technique among a plurality of communication techniques for communication in the talk room, wherein
the selection is based on the communication level of each user of the plurality of users exceeding a determined threshold, and each communication technique of the plurality of communication techniques corresponds to a different mode of communication and a different amount of the information shared in the talk room.

* * * * *